United States Patent Office

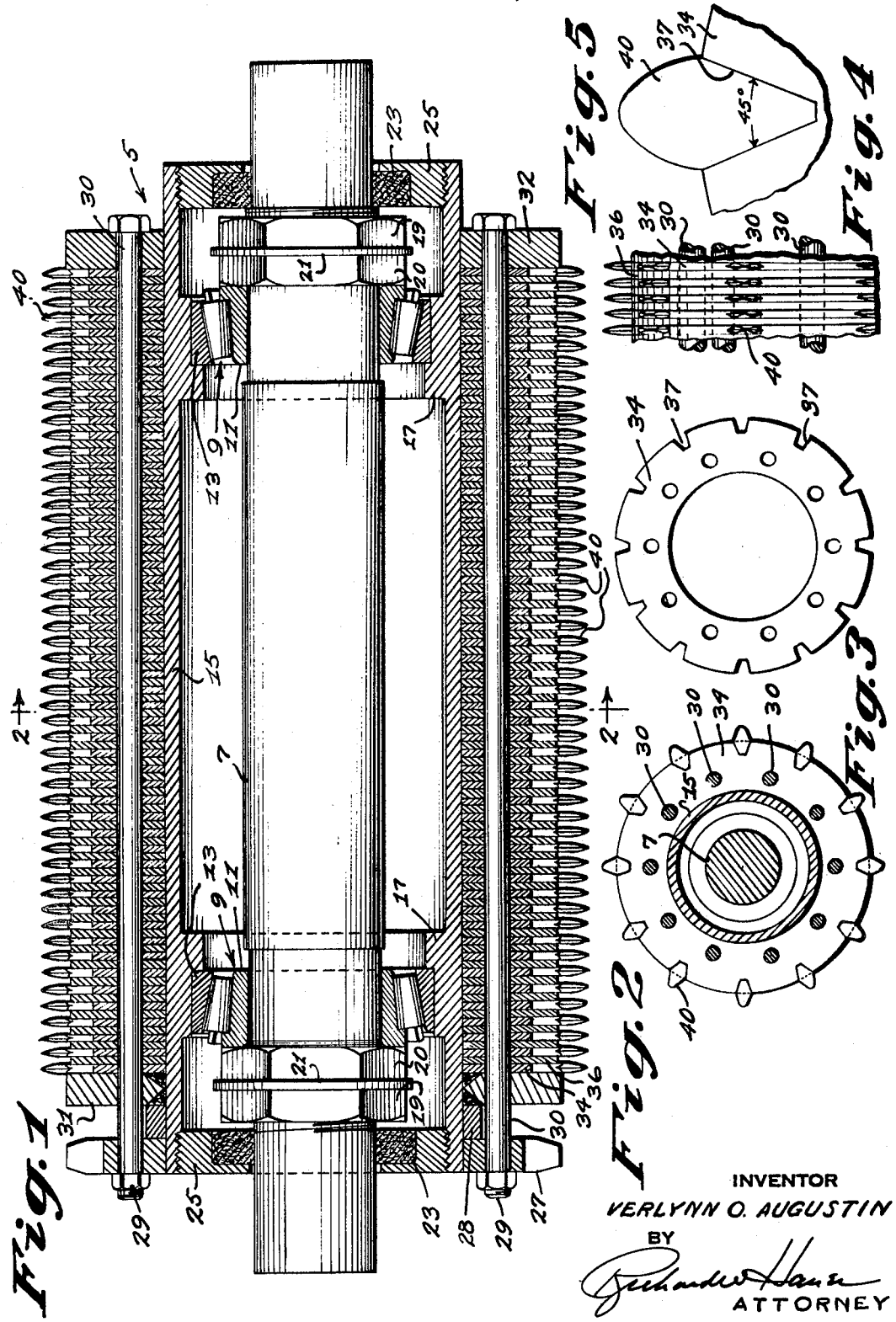

3,478,790
Patented Nov. 18, 1969

3,478,790
INCISING DRUM FOR WOODEN MEMBERS
Verlynn O. Augustin, El Paso County, Colo., assignor to Wood Treating Chemicals Company, St. Louis, Mo., a corporation of Missouri
Filed Mar. 13, 1967, Ser. No. 622,797
Int. Cl. B27g *13/08*
U.S. Cl. 144—233    3 Claims

ABSTRACT OF THE DISCLOSURE

Apparatus for puncturing wooden pieces which are to be treated with preservative having a rotating drum with projecting teeth. The drum is made up of stacked laminations, every other one of which holds some of the teeth in V-shaped notches around the periphery of the lamination. The teeth are secured by the wedging of the tooth in the notch and the sandwiching forces of adjacment laminations.

---

The present invention relates generally to apparatus involved in the preservative treatment of wooden poles, beams and like members. More specifically, the invention pertains to a means for making incisions or punctures in the wood to facilitate and secure the proper penetration of the preservative while at the same time avoiding serious structural deformations to the timber.

The basic art to which this invention pertains has been practiced for a number of years, however, the incising machines of the prior art have been attended with certain disadvantages which it is the object of this invention to overcome.

Chief among the problems with the prior art devices is that of tooth breakage and wear. Most of the incising drums have been provided with a plurality of spaced peripheral teeth which are adapted to penetrate the wood as the drum comes into rolling contact therewith. These teeth are secured in the drum body by being wedged in a substantially trapezoidal shaped slot, as shown in the U.S. patent to Edwards et al., No. 1,646,955, or the teeth may be made an integral protrusion of an annular disk, a plurality of which make up the drum, as shown in the U.S. patent to Howe, No. 1,346,126. Both of these machines have served well but it will be apparent that replacement of even a single tooth requires a complete disassembly of the drum. One objective of the present invention is the provision of an incising tooth and holding means therefor that will simplify the replacement and repair of incisor teeth and will eliminate the need for dismantling the entire drum when replacing a tooth.

Other and more specific objects, features and advantages of the present invention will become apparent upon the reading of the following description of a preferred form of the invention taken in conjunction with the accompanying drawings in which:

FIGURE 1 is a longitudinal section through the axis of the drum.

FIGURE 2 is a cross sectional view along lines 2—2 of FIGURE 1.

FIGURE 3 is an end view of the retaining disk.

FIGURE 4 is an enlarged fragmentary view of the periphery of the drum showing the teeth in perspective.

FIGURE 5 is an enlarged fragmentary view of the retaining disk showing one tooth in plan view.

Referring to the drawings, and particularly to FIGURE 1 thereof, the incisor drum is indicated generally by the reference numeral 5. The drum 5 is rotatably mounted on a spindle 7 by standard bearings 9 having inner and outer races 11 and 13. The drum 5 comprises a hollow inner core 15 which is formed of a cylindrical tube having an inner shoulder 17 near each end thereof for receiving and holding the cup or outer race 13 of the bearing 9. Threaded to the spindle 7 outwardly of the bearings 9 are a pair of lock nuts 19 and 20, having a lock washer 21 therebetween, all adapted to maintain the bearings 9 in their proper position on the spindle 7. End caps 25, which are provided with fiber inner surfaces 23, are threaded to the inside of each end of the drum cone 15 in order to seal the bearings from dust and dirt.

The drum is rotated on the spindle 7 by means of a chain drive (not shown) which may be coupled to an annular drive sprocket 27 removably and slidably fitted onto the periphery of the core tube 15. Separated from the sprocket 27 by a spacer ring 28 is an anchoring collar 31 welded to the drum core 15. Through a plurality of equiangularly spaced holes in the anchoring collar 31 pass elongated tension rods 30 whose function it is to hold the drum assembly together. The heads of the tension rods bear against a slidable end plate 32 disposed on one end of the tube 15 and the tension rod nuts 29 provide securing force for the sprocket 27 which is mounted on the other end of the drum core tube 15.

Intermediate the anchoring collar 31 and the end plate 32 are a plurality of annular tooth retaining disks 34 which are alternately disposed along the drum with annular spacers 36. Each of the disks 34 is provided around its circumference with a plurality of tooth receiving notches 37 whose sides are inclined toward the bottom of the notch in order to form an opening which is wider at the periphery of the disk than at the bottom of the notch 37. Preferrably the angle formed by the inclined sides of the notch is approximately 45°. Into each of the notches 37 is placed a puncture forming tooth 40 whose root sides are inclined at the same angle as that formed by the sides of the notch 37 in the tooth retaining disk 34. The inwardly directed pressure exerted on each tooth during a puncturing operation acts to wedge the tooth firmly into the open notch 37. This wedging action, coupled with the oppositely directed sandwiching forces exerted on the tooth 40 by the adjacent spacer plates 36 when the tension rods are fastened, serves to secure each tooth in place.

To remove a tooth it is only necessary to relieve the tension force on the tension rods 30 by loosening the nuts 29 and, after a gentle tap to break the wedge forces, lift the tooth out. Thus, it is seen that teeth may be easily and quickly replaced without the necessity of removing all of the tension rods, disks and spacer plates.

Having thus described the several useful and novel features of the incising drum for wooden members of the present invention in connection with the accompanying drawings, it will be seen that the many worthwhile objectives for which it was designed have been achieved. Although but a few of the several possible embodiments of the invention have been illustrated and described herein, I realize that certain additional modifications may well occur to those skilled in the art within the broad teaching hereof; hence, it is my intention that the scope of protection afforded hereby shall be limited only insofar as said limitations are expressly set forth in the appended claims.

I claim:

1. Apparatus for incising and puncturing wooden members, including in combination:
    a spindle;
    a tubular core;
    means rotatably mounting said core on said spindle;
    a pair of spaced apart annular plates, one of said plates slidably mounted on the periphery of said core and the other of said plates securely fastened thereto;
    a plurality of annular disks mounted on the core and between the said plates, each disk having a plurality of notches around the periphery thereof; said notches being substantially V-shaped and diverging toward said periphery; teeth members disposed in said V-shaped notches and having root sides inclined at the same angle as the notches, whereby an inwardly directed pressure extered on each tooth acts to wedge the tooth firmly into said notch;

a plurality of annular spacer members mounted on the said core between the said disks and overlying at least a portion of said root edges;

means applying a compressive force to sandwich said plates, disks and spacer members together.

2. The combination of claim 1 and further including drive means secured to the tubular core.

3. The combination of claim 2 wherein the means applying a compressive force includes a plurality of elongated rods having a head on one end and a threaded nut on the other end and adapted to be disposed in aligned holes in the said plates, disks and spacers.

References Cited

UNITED STATES PATENTS

| | | | |
|---|---|---|---|
| 179,401 | 7/1876 | Coogan | 144—233 |
| 501,213 | 7/1893 | Raabe | 144—233 |
| 1,646,812 | 10/1927 | Davey et al. | 144—235 X |
| 2,781,802 | 2/1957 | Pence. | |
| 3,125,141 | 3/1964 | Best et al. | |

ANDREW R. JUHASZ, Primary Examiner

GIL WEIDENFELD, Assistant Examiner

U.S. Cl. X.R.

144—2